United States Patent
Haller et al.

(10) Patent No.: US 7,156,156 B2
(45) Date of Patent: Jan. 2, 2007

(54) HEAT EXCHANGER WITH THERMAL INERTIA FOR A HEAT TRANSFER FLUID CIRCUIT, PARTICULARLY OF A MOTOR VEHICLE

(75) Inventors: Regine Haller, Boissy sans Avoir (FR); Loic Lepetit, Puteaux (FR); Christian Petit, Marly le Roi (FR); Didier Loup, Maurepas (FR)

(73) Assignee: Valeo Climatisation, La Verriere (FR)

( * ) Notice: Subject to any disclaimer, the term of this patent is extended or adjusted under 35 U.S.C. 154(b) by 191 days.

(21) Appl. No.: 10/722,002

(22) Filed: Nov. 25, 2003

(65) Prior Publication Data

US 2004/0104020 A1 Jun. 3, 2004

(30) Foreign Application Priority Data

Nov. 29, 2002 (FR) .................................. 02 15034

(51) Int. Cl.
 *F28D 19/00* (2006.01)
 *F28F 1/04* (2006.01)
 *F25D 11/02* (2006.01)
(52) U.S. Cl. ........................................ 165/10; 165/177
(58) Field of Classification Search ................. 165/10, 165/41–42, 61, 104.14, 104.17, 138, 151, 165/173, 901–902, 174, 177, 178; 62/430–432, 62/434, 438, 515
See application file for complete search history.

(56) References Cited

U.S. PATENT DOCUMENTS

| | | | |
|---|---|---|---|
| 4,696,338 A * | 9/1987 | Jensen et al. .......... | 165/104.17 |
| 5,186,242 A | 2/1993 | Adachi et al. | |
| 5,239,839 A * | 8/1993 | James .......................... | 62/434 |
| 5,314,013 A * | 5/1994 | Tanabe ....................... | 165/176 |
| 5,531,268 A * | 7/1996 | Hoshino et al. ............. | 165/153 |
| 5,553,662 A * | 9/1996 | Longardner et al. ........ | 165/202 |
| 5,896,914 A * | 4/1999 | Fieback et al. ............... | 165/10 |
| 6,101,830 A * | 8/2000 | Feuerecker ................... | 62/304 |
| 6,327,871 B1 * | 12/2001 | Rafalovich .................... | 62/434 |
| 6,370,908 B1 * | 4/2002 | James .......................... | 62/434 |
| 6,568,205 B1 * | 5/2003 | Bureau et al. ................. | 62/515 |
| 6,691,527 B1 * | 2/2004 | Bureau et al. ................. | 62/244 |
| 6,854,513 B1 * | 2/2005 | Shirota et al. .............. | 165/203 |
| 6,964,296 B1 * | 11/2005 | Memory et al. ............ | 165/151 |
| 2002/0002837 A1 | 1/2002 | Shirota et al. | |

FOREIGN PATENT DOCUMENTS

| | | |
|---|---|---|
| DE | 10045175 A1 | 5/2001 |
| EP | 1221389 A2 | 7/2002 |
| GB | 1586469 | 3/1981 |
| JP | 59205591 | 11/1984 |

\* cited by examiner

*Primary Examiner*—Tho Duong
(74) *Attorney, Agent, or Firm*—Ronald Courtney (57) ABSTRACT

A heat exchanger for a heat transfer fluid circuit comprising ducts for the circulation of the heat transfer fluid, which are inserted between an inlet and an outlet, is described. Cavities designed to contain a heat storage fluid adjacent to the cooling fluid circulation ducts and associated with heat-exchanger surfaces, so that heat storage fluid is capable of exchanging heat with the air flow, if the circulation of the heat transfer fluid is stopped, are also described.

6 Claims, 5 Drawing Sheets

HEAT EXCHANGER WITH THERMAL INERTIA FOR A HEAT TRANSFER FLUID CIRCUIT, PARTICULARLY OF A MOTOR VEHICLE

FIELD OF THE INVENTION

The invention relates to the field of heat exchangers, particularly for motor vehicles.

It relates more specifically to a heat exchanger for a fluid circuit through which a heat transfer fluid runs, comprising at least one manifold delimiting an inlet and an outlet for the heat transfer fluid, circulation ducts for the heat transfer fluid which are inserted between the inlet and the outlet, and heat-exchange surfaces associated with the heat transfer fluid circulation ducts and able to be swept by a flow of air that is to be conditioned.

In the particular case of a motor vehicle, the heat exchanger may be produced, for example, in the form of an air-conditioning evaporator through which a cooling fluid runs so as to cool the flow of air and produce conditioned air which is sent into the cabin of the vehicle. The heat exchanger may also be produced in the form of a heating radiator, also known as a unit heater, through which a heating fluid, generally the vehicle engine cooling fluid, runs so as to heat up the flow of air and produce hot air which is sent into the cabin.

BACKGROUND OF THE INVENTION

In a conventional air-conditioning circuit, the cooling fluid passes, in this order, through a compressor, a condenser, an expander and an evaporator before returning to the compressor. In the evaporator, the cooling fluid passes from a liquid phase or liquid/vapor phase to a vapor phase, absorbing heat from the air flow which thus becomes cooled. A conventional circuit such as this usually has running through it a cooling fluid consisting of a fluorinated hydrocarbon such as the one known by the name R134A.

Air-conditioning circuits through which a cooling fluid of supercritical type, such as $CO_2$ for example, runs are also known.

One of the disadvantages with the known evaporators lies in the fact that their ability to cool the air flow depends on the operation of the compressor. In other words, the air flow is no longer cooled as soon as the compressor is stopped.

Now, in most motor vehicles, the compressor is driven via the engine and is therefore placed out of operation as soon as the engine is stopped.

In the context of anti-pollution standards, it is anticipated that motor vehicles of the "stop-start" type will be produced, these being vehicles in which the internal combustion engine is stopped when the vehicle is in neutral, then the engine is re-started when necessary, using an alternator/starter. The result of this would be that when a vehicle of this type was in neutral, with the internal combustion engine stopped, the air-conditioning would also be stopped. The stopping of the internal combustion engine causes the stopping of the compressor, hence causing the passenger or passengers of the vehicle to experience discomfort.

In order to overcome this disadvantage it has already been proposed for air-conditioning circuits to be produced that comprise, aside from the evaporator, auxiliary means for producing cold and which consist, for example, in providing a reserve of ice to cool the flow of air when the evaporator is not in operation. These known solutions are bulky and complicated to produce and prove to be somewhat incompatible with modern vehicles in which the space dedicated to the various equipment items, particularly in the engine compartment, is becoming increasingly cramped.

A similar problem may arise when the heat exchanger is produced in the form of a heating radiator through which a heating fluid runs, because this fluid is set in motion by a pump, also known as the "water pump", which is conventionally driven by the vehicle's internal combustion engine. Thus, when the engine is stopped, this stops the pump and therefore stops the circulation of the fluid, hence giving rise to an experience of discomfort, especially when the exterior temperature is very low.

SUMMARY OF THE INVENTION

It is a particular object of the invention to overcome the aforementioned disadvantages by proposing means of storing heat to store either cold (that is to say cold energy) or, on the other hand, heat (that is to say heat energy) when the internal vehicle engine is operating and to restore this energy (cold or heat) to the cabin when the engine is stopped.

To this end, the invention proposes an evaporator of the type defined above, which further comprises cavities which are designed to contain a heat storage fluid, are situated adjacent to the heat transfer fluid circulation ducts and are also associated with the heat-exchange surfaces in such a way that the heat storage fluid is able to exchange heat with the air flow that sweeps the heat-exchange surfaces if the circulation of the heat transfer fluid through the circuit is stopped.

Thus, the heat exchanger of the invention incorporates cavities filled with a heat storage fluid, which form a reserve of this fluid and which are adjacent to the heat transfer fluid circulation ducts.

In that way, exchange of the heat between three fluids, namely the heat transfer fluid (the cooling fluid or heating fluid), the heat storage fluid and the air to be conditioned (cooled or heated) is encouraged.

The invention is particularly beneficial where the heat exchanger is an air-conditioning evaporator. Thus, when the evaporator is operating, that is to say when the cooling fluid circulates under the action of the compressor, the evaporator produces cold. That makes it possible both to cool the flow of air that is to be sent into the cabin of the vehicle and also to solidify the phase-change fluid or keep it in this solidified state.

In that way, as soon as the circulation of cooling fluid is stopped and the evaporator is no longer able to cool the flow of air, it is the heat storage fluid which takes over. In other words, the flow of air is cooled by a heat exchange with the heat storage fluid which then gives up cold to the air flow. The heat storage fluid, which is advantageously a phase-change fluid, then has a tendency to melt to return to the liquid state.

This then affords an evaporator with significant thermal inertia making it possible to cool the air flow even when the vehicle engine is stopped for periods which may reach and exceed, for example, thirty seconds.

The invention is also particularly beneficial where the heat exchanger is a heating radiator. This is because when the radiator is in operation and the heating fluid is circulating under the action of heat, the radiator produces heat. That makes it possible both to heat up the flow of air that is to be sent into the cabin, and also to store heat in the heat storage fluid, the temperature of which rises and may possibly experience a phase change.

Thus, once the circulation of heating fluid ceases, and the heating radiator is no longer able to heat up the air flow, it is the heat storage fluid that takes over. In other words, the air flow is heated up by exchange of heat with the heat storage fluid which then gives up heat to it. The heat storage fluid therefore experiences a drop in temperature possibly accompanied by a change in phase.

In this case, a heating radiator is afforded that has significant thermal inertia making it possible to heat up the air flow even when the vehicle engine is temporarily stopped for a period that may, for example, be as much as one minute.

In one embodiment of the invention, the heat exchanger comprises a multiplicity of parallel flat tubes having two opposed large faces and in which the ducts and the cavities are formed, and a multiplicity of corrugated inserts forming heat-exchange surfaces, each of which is arranged between two adjacent tubes.

In this first embodiment of the invention the flat tube may be made up of two parts in the form of plates, namely a part in which the ducts are formed and a part in which the cavities are formed.

As an alternative, each flat tube is of one piece, and the ducts are arranged along one of the large faces, while the cavities are arranged along the other large face.

In another alternative embodiment, each flat tube is of one piece whilst the ducts are arranged in groups between the large faces, and the cavities are also arranged in groups between the large faces, the groups of ducts alternating with the groups of cavities.

In a second embodiment of the invention, the heat exchanger comprises a multiplicity of flat tubes in the shape of a hairpin or of a capital U, in which the ducts and the cavities are formed, and a multiplicity of corrugated inserts forming heat-exchange surfaces, each of which is arranged between two adjacent tubes. In this embodiment, each flat tube is advantageously of one piece.

In a third embodiment of the invention, the heat exchanger comprises a flat tube in the form of a coil in which the ducts and the cavities are formed. In this case, it is advantageously contrived that the coil-shaped flat tube is formed of a multiplicity of U-shaped inner tubes in which the ducts are formed and of a coil-shaped outer tube surrounding the U-shaped tubes and in which the cavities are formed.

In the aforementioned embodiments, which are given solely by way of example, the tubes are advantageously formed by extruding a metallic material, advantageously one based on aluminum.

The heat exchanger advantageously comprises at least one conduit which communicates with the cavities. When the heat exchanger is an evaporator designed to have a cooling fluid running through it, the heat storage fluid is advantageously formed of a phase-change fluid with a melting point of between 0 and 10° C., preferably between 5 and 7° C.

The heat storage fluid is advantageously chosen from paraffins, hydrated salts and eutectic compounds or any other fluid exhibiting a phase change in this temperature range.

As an alternative, the heat storage fluid may be water, but then exhibits the disadvantage of expanding when changing from the liquid state to the solid state and of encouraging glaciation phenomena.

When the exchanger is a heating radiator designed to have a heating fluid running through it, the heat storage fluid constitutes a reserve of heat (that is to say of heat energy) so that the heat storage fluid is capable of heating up the flow of air which sweeps across the heat-exchange surfaces if the circulation of the heating fluid through the heating radiator is temporarily stopped. The heat storage fluid is advantageously a phase-change fluid having a melting point of between 60 and 90°, preferably between 70 and 80°.

The heat storage fluid is advantageously chosen from paraffins, hydrated salts and eutectic compounds. However, it may also consist of water. In this case, the heat storage fluid does not experience a change in phase and heat storage is achieved only by appreciable heating.

BRIEF DESCRIPTION OF THE DRAWINGS

In the description which follows, given solely by way of example, reference is made to the attached drawings, in which.

DETAILED DESCRIPTION OF THE INVENTION

In the detailed description which follows, reference is made to the particular case of an evaporator, but the characteristics thereof apply also to a heating radiator, as mentioned hereinabove. Reference will first of all be made to FIG. 1 which shows an evaporator 10 able to form part of a conventional air-conditioning circuit (not depicted) of a motor vehicle, in which a cooling fluid passes in succession through a compressor, a condenser and an expander before reaching the evaporator then returning to the compressor.

Figure 1:
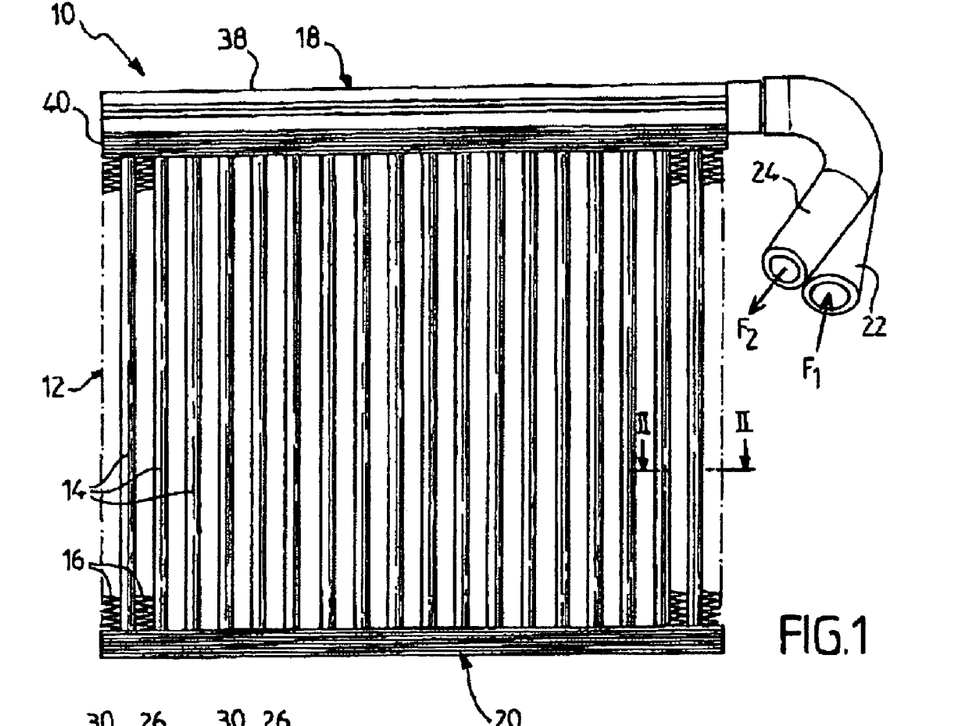
FIG. 1 is a side view of a heat exchanger with parallel tubes according to the invention.

The evaporator 10 comprises a body or bundle 12 formed of a multiplicity of parallel tubes 14 which alternate with corrugated inserts 16 forming heat-exchange surfaces. The bundle 12 is inserted between two manifolds, namely a manifold 18 here placed at the upper part and a manifold 20 here placed at the lower part. The manifold 18 is equipped with an inlet nozzle 22 for the cooling fluid in liquid phase or in liquid/vapor phase and with an outlet nozzle 24 for the cooling fluid in gaseous phase. The cooling fluid enters the nozzle 22 as shown by the arrow F1 and emerges from the nozzle 24 as shown by the arrow F2 after having exchanged heat with a flow of air which sweeps across the bundle 12 as shown by the arrows F3 in FIG. 2. In a conventional evaporator, the tubes 14 have circulation ducts for the cooling fluid that exchanges heat with the air flow. The cooling fluid in liquid phase or in liquid/vapor phase is converted into the vapor phase, absorbing heat, thus cooling the air flow. In other words, the cooling fluid gives up cold energy to the flow of air so as to produce a flow of refrigerated or conditioned air which is sent into the cabin of the vehicle.

The tubes 14 of the invention differ from the tubes of the conventional evaporators in that they offer a dual function, namely of allowing the cooling fluid to circulate, and also of storing a heat storage fluid which, in this example, is a phase-change fluid. Hereinafter, reference will be made to a phase-change fluid, for simplicity.

Figure 2:
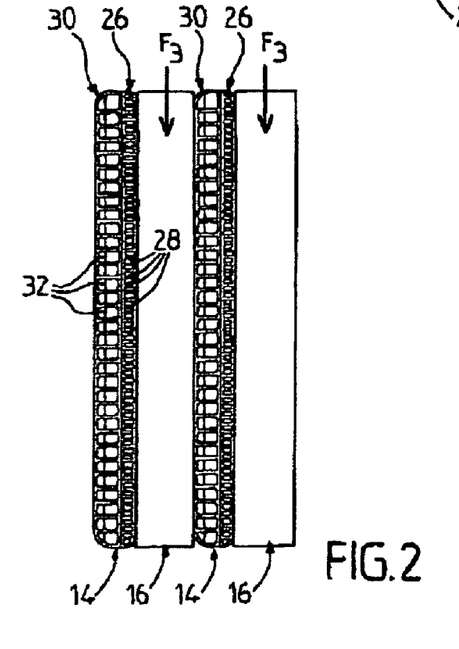
FIG. 2 is a view in section, on a larger scale, on II—II of FIG. 1.
Figure 3:
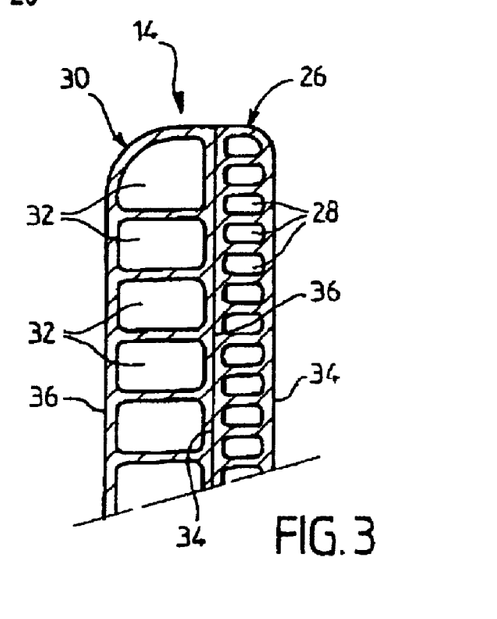
FIG. 3 is a detail, on a larger scale, of FIG. 2.

As can be seen in FIGS. 2 and 3, the tube 14 is made up of two parts in the form of plates, namely a first part 26 in which ducts 28 are formed for the circulation of the cooling fluid and a second part 30 in which cavities 32 are formed, these delimiting cells, and enabling the storage of the phase-change fluid.

The part or plate 26 is produced by extruding a metallic material, preferably aluminum or an aluminum-based alloy. In the example, the part or plate 26 comprises a row of ducts 28, each having a cross section of substantially rectangular shape and it is delimited by two parallel large faces 34.

The part or plate 30 is also formed by extrusion of a similar metallic material and it comprises a row of cavities 32 each having a cross section of rectangular overall shape, except for the cavities situated at the ends of the plate 30. This plate 30 is delimited by two parallel large faces 36. One of the large faces 34 of the plate 26 is connected to one of the large faces 36 of the plate 30, for example, by brazing to form an almost one-piece entity. It is also advantageous, in order to make the evaporator easier to construct, for components to be formed (see FIG. 2), each of which is made up of a tube (part 26 and part 30) and of a corrugated insert 16. The corrugated inserts 16 are advantageously formed of a metallic material of the same type.

The ducts 28 have chosen internal dimensions and are delimited by walls of chosen thickness, to take account of the nature and operating pressures of the cooling fluid used.

Thus, in the case of a conventional cooling fluid, such as R134A, the ducts 28 have a hydraulic diameter generally of between 1 and 2 mm, the burst pressures having to be around 36 bar.

By contrast, in the case of a cooling fluid such as $CO_2$, the ducts will generally have dimensions of between 0.5 and 1 mm, the burst pressures having to be around 250 bar.

The cavities 32 are intended to contain a heat storage fluid which, in the example, is a phase-change fluid, that is to say a fluid whose melting point will be between 0° C. and 10° C.

Thus, when the evaporator is in operation, that is to say when the cooling fluid is flowing through the ducts under the action of the compressor, it has a dual function. On the one hand, it allows the cooling of the flow of air to be sent into the cabin, and on the other hand it allows the phase-change fluid to be converted into or kept in the solid state.

By contrast, as soon as the evaporator is out of operation and the cooling fluid no longer flows through the ducts, the phase-change fluid is able to cool the air flow because of the cold energy it has stored. The result of this is that this phase-change fluid absorbs heat from the air flow to cool it, the fluid returning at least in part to the liquid state. The phase-change fluid fills the cavities 32 of the tubes, and these cavities may communicate with one another as will be seen later. In theory, this phase-change fluid does not have to flow through the evaporator.

The phase-change fluid may consist of water but this has the disadvantage that this water expands when it changes from the liquid state to the solid state and that it may generate glaciation phenomena.

It is preferable to use phase-change fluids, the melting point of which is between 5° C. and 7° C. Among the conceivable materials, mention may in particular be made of materials of the family of paraffins, or alternatively hydrated salts and eutectic compounds.

Among paraffins, mention may be made in particular of the one denoted by the trade name RT5 by Rubitherm.

An advantageous material is a paraffin with a melting point of $\Delta h=150$ kJ/kg and a density of 0.8. It is preferable to use phase-change materials with a conversion enthalpy of 150 kJ/kg or higher. As a preference, the melting point will be above 0° C. so as to avoid glaciation problems and above all so as not to penalize the thermodynamic cycle excessively through an excessively low pressure drop. Furthermore, the melting point will preferably be below 10° C. to make it possible to obtain, by recuperating the stored energy, temperatures that are low enough to meet comfort constraints.

By way of example, the cross section of the cavities 32 may have a length of the order of 3 mm for a width of the order of 1 mm, these dimensions of course being subject to variation. These dimensions and the thicknesses of the walls surrounding the cavities 32 are chosen also to take account of pressure constraints. The pressures of the phase-change fluid are much lower, generally below 5 bar.

The total amount of phase-change fluid depends on the heat energy (cold) that needs to be transferred to the flow of air to be sent into the cabin. Thus, if an energy of 2500 watts is considered over thirty seconds, starting from a phase-change material with a conversion enthalpy of 150 kJ/kg or higher, that leads to $7.5 \times 10^4$ J namely 0.5 kg and 0.625 liter for a fluid with a density of 0.8 as mentioned above. In other words, it is necessary to provide a volume of at least 0.625 liter for the phase-change fluid contained in the cavities 32.

Figure 4:
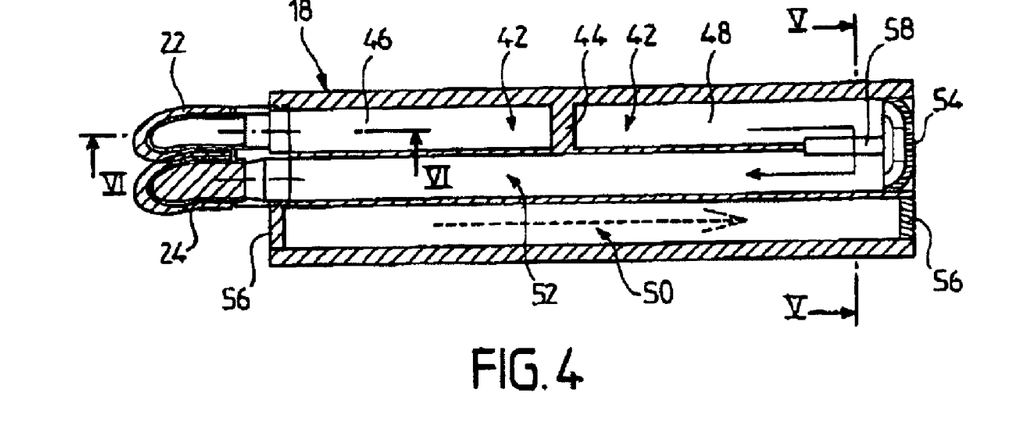
FIG. 4 is a view in longitudinal section of the manifold of the heat exchanger of FIG. 1.
Figure 5:
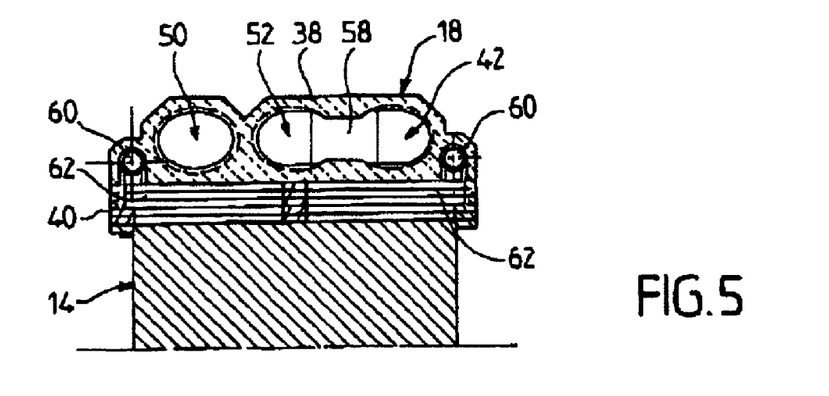
FIG. 5 is a partial view in section, on an enlarged scale, on V—V of FIG. 4.
Figure 6:
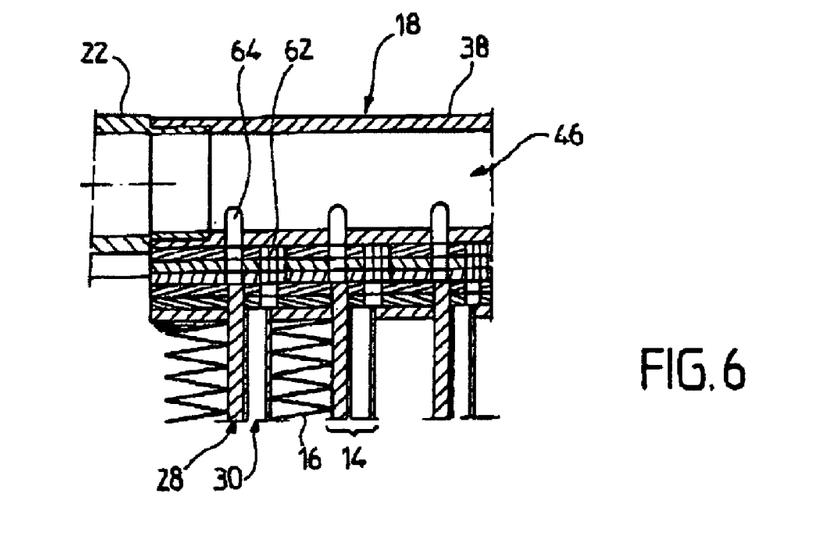
FIG. 6 is a partial view in section, on an enlarged scale, on VI—VI of FIG. 4.

Reference is now made to FIGS. 4 to 6 for a more detailed description of the structure of the manifold 18, in the particular example of FIG. 1. The manifold 18 comprises a cover 38 arranged on a manifold plate 40 formed by the superposition of several plates delimiting circulation passages or openings.

The cover 18 has an elongate shape and internally delimits three parallel conduits. A first conduit 42 is separated and divided by a partition 44 to form an inlet compartment 46 and an intermediate compartment 48. Opposite the conduit 42 there is a conduit 50 that forms a circulation compartment. Another conduit 52 placed between the conduits 42 and 50 forms an intermediate compartment. The inlet nozzle 22 communicates with the compartment 46 while the outlet nozzle 24 communicates with the compartment 52. The compartment 42 and the compartment 52 are closed at one end by a plug 54, while the compartment 50 is closed at both ends by plugs 56.

The cooling fluid circulates in four passes through the evaporator. It first of all enters the compartment 46 to then reach the compartment 50 via the manifold 20, then the compartment 48 via the same manifold 20. From there, the fluid reaches the compartment 52 via an opening 58 formed in the partition separating the conduits 42 and 52, on the same side as the plug 54. The fluid then reaches the outlet 24.

The manifold 20 is formed of a stack of plates which delimit appropriate passages (not depicted) to cause the compartment 46 to communicate with the conduit 50 and the conduit 50 to communicate with the conduit 48. The sectional view of FIG. 5 shows the conduits 42, 50 and 52 and the passage 58 between the conduits 42 and 52.

As can also be seen in FIG. 5, the cover 18 of the manifold delimits two longitudinal conduits 60 which communicate via passages 62 with the cavities 32 of the tubes 14. In that way, the two conduits 60 make it possible to establish communication between the cavities 32 of the various tubes.

FIG. 6 also shows passages 64 that allow the cooling fluid circulation ducts 28 to communicate with the conduits, in this instance with the conduit 42 and more particularly, the inlet compartment 46. The passages 60 and 62 consist of openings of appropriate shape, formed through the stacked plates that make up the manifold 40.

In FIG. 6, the cooling fluid circulation ducts 28 are not visible, the section being taken through a transverse partition separating two adjacent ducts 28.

It must be understood that the evaporator 10 depicted in FIGS. 1 to 6 is just one particular embodiment of an exchanger having mutually parallel tubes. In this particular embodiment, the cooling fluid circulates in four passes, but it could of course circulate differently.

In general, the circulation of the heat transfer fluid is as in a conventional evaporator. The main difference resulting from the fact that the circulation ducts also incorporate cavities intended to contain the phase-change fluid. [sic]

Figure 7:
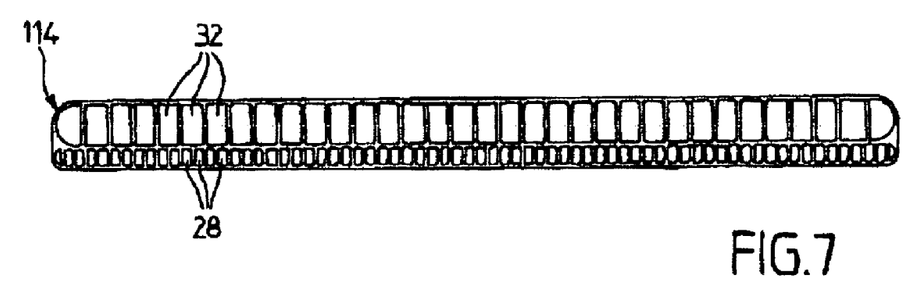
FIGS. 7 to 10, are views in section of tubes able to form part of a heat exchanger according to the invention.

Reference is now made to FIG. 7 which shows a tube 114 similar to the tube 14 of FIGS. 1 to 3. The main difference lies here in the fact that the tube 114 is made of a single piece by extrusion rather than by assembling two plates as before. The tube 114 here is formed of a metallic material similar to the one already described.

The conduit 114 of FIG. 7 comprises a row of ducts 28 situated near one of the large faces and a row of cavities 32 arranged near the other large face. Here again, the ducts and the cavities have chosen dimensions and are separated by partitions of chosen dimensions taking account of the operating pressures of the cooling fluid and of the phase-change fluid.

Figure 8:
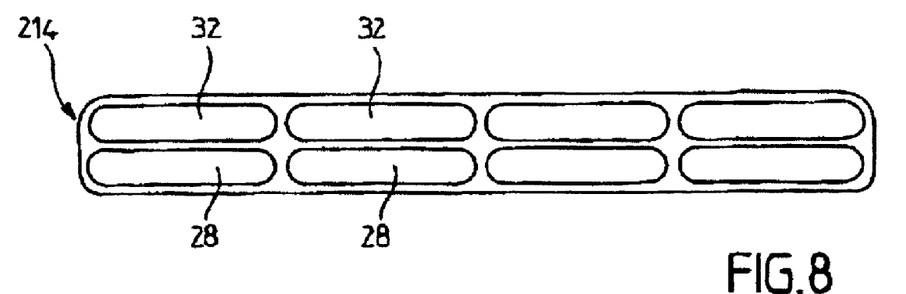

The tube 214 depicted in FIG. 8 can be likened to that of FIG. 7 and is also formed as a single piece by extrusion. In the example, it comprises four ducts 28 arranged near one of the large faces and four cavities 32 arranged near the other of the large faces. These ducts and cavities have elongate shapes, their longest length running parallel to the direction of the large faces of the tube 214. Here, the ducts 28 and the cavities 32 have the same cross section.

Figure 9:
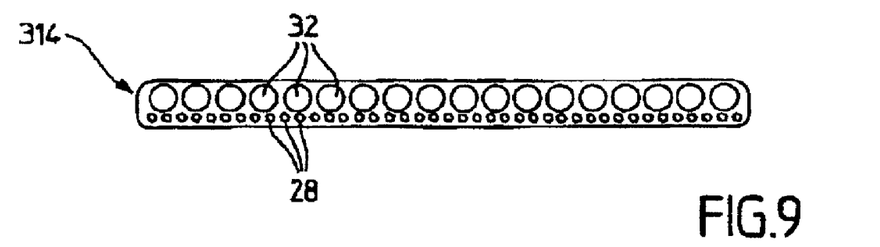

Reference is now made to FIG. 9 which shows another tube 314 similar to that of FIG. 7 and which is also formed of a single piece by extrusion. It comprises a row of ducts 28 which is arranged near one of the large faces for the circulation of the cooling fluid and a row of cavities 32 which is situated near the other of the large faces for the circulation of the phase-change fluid. In this particular example, the ducts 28 have a circular cross section, the diameter of which may, for example, be 0.85 mm. The cavities 32 also have a circular cross section, the diameter being of a higher value, for example 3 mm.

Figure 10:
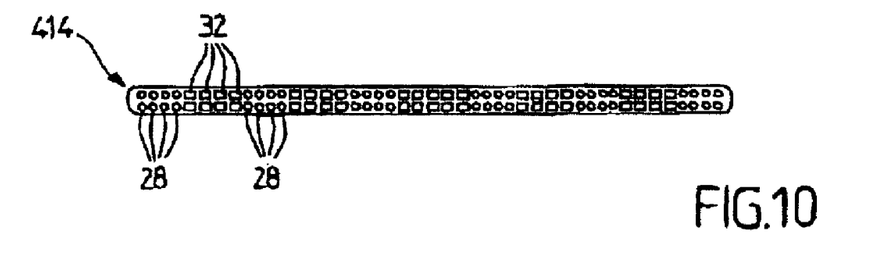

Reference is now made to FIG. 10 which shows another tube 414 also made as a single piece by extrusion. This tube comprises ducts 28 arranged in groups between the two large faces and cavities 32 also arranged in groups between the two large faces. The groups of ducts alternate with the groups of cavities. For example, there is a group of eight cavities 32 which are arranged in two rows alternating with a group of eight ducts 28 which are arranged in two rows. The ducts 28 here each have a circular cross section, the diameter of which may, for example, be 0.85 mm. In this example, the cavities 32 have a rectangular cross section with a length of 2.1 mm and a width of 0.85 mm.

FIGS. 7 to 10 show nonlimiting exemplary embodiments of one-piece tubes in which both cooling fluid circulation ducts 28 and cavities 32 containing the phase-change fluid are formed.

Figure 11:
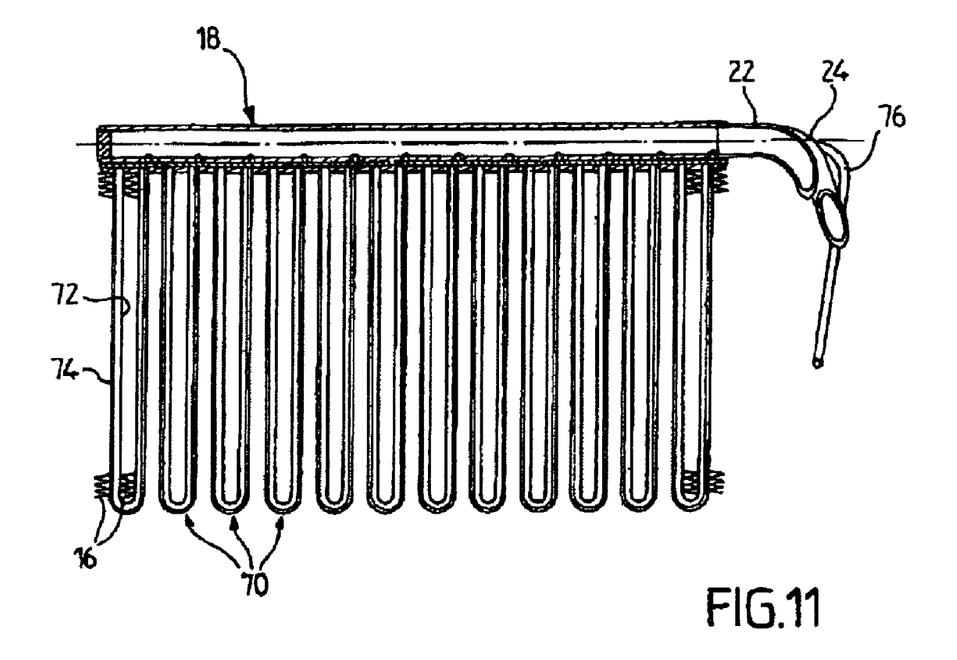
FIG. 11 is a view in longitudinal section of a heat exchanger with U-shaped tubes according to the invention.

The evaporator depicted in FIG. 11 comprises a single manifold 18 into which an inlet nozzle 22 and an outlet nozzle 24 for the circulation of the cooling fluid open. In this exemplary embodiment, the evaporator comprises a plurality of tubes 70 in the shape of a U or of a hairpin, which, as in the case of the previous embodiment, allow the circulation of a cooling fluid and the storage of a phase-change fluid. Each of the tubes 70 comprises an inner part 72 in which the cavities 32 (not visible in the drawing) for storing the phase-change fluid are formed and an outer part 74 containing ducts 28 (not visible in the drawing) for the circulation of the cooling fluid.

Each of the tubes 70 is advantageously made of one piece by extrusion of a metallic material of the type defined hereinabove. The cooling fluid circulates through the ducts 28 in one or several passes. Furthermore, the phase-change fluid is contained in the cavities 32 which communicate with one another via appropriate passages in the manifold and with two conduits 76, just one of which is visible in the sectioned view of FIG. 11. Between and inside the U-shaped tubes there are corrugated inserts 16 similar to those depicted in FIG. 11.

Figure 12:
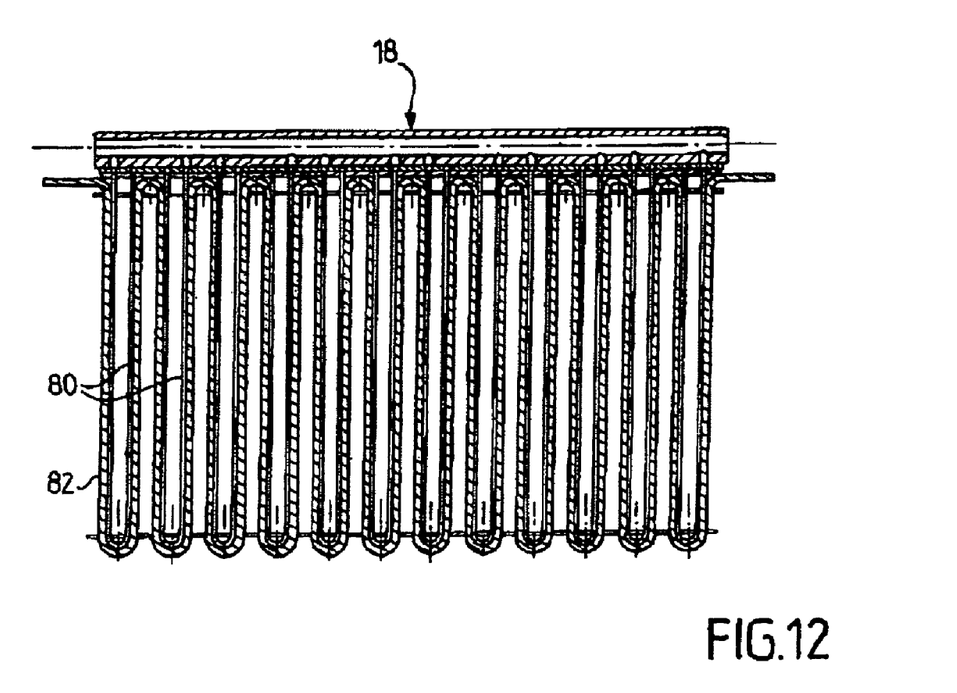
FIG. 12 is a view in longitudinal section of a heat exchanger with a coil-shaped tube according to the invention.

In the embodiment of FIG. 12, the evaporator comprises a single manifold 18 into which the U-shaped or hairpin-shaped tubes 80 which contain ducts 28 (not visible in the drawing) for the circulation of the cooling fluid open. These U-shaped or hairpin-shaped tubes 80 are externally surrounded by a single tube 82, in the shape of a coil, in which cavities 32 (not visible in the drawing) containing the phase-change fluid are formed.

In this embodiment, what is formed here is the equivalent of a serpentine coil, but this coil is formed, on the one hand, of the U-shaped tubes 80, and on the other, of the coil 82 surrounding the tubes 80. In an alternative form of the embodiment (not depicted) it will be possible to use a single coil incorporating the ducts and the cavities. Although this has not been depicted in FIG. 12, the evaporator may further incorporate corrugated inserts 16 similar to those described hereinabove.

Figure 13:
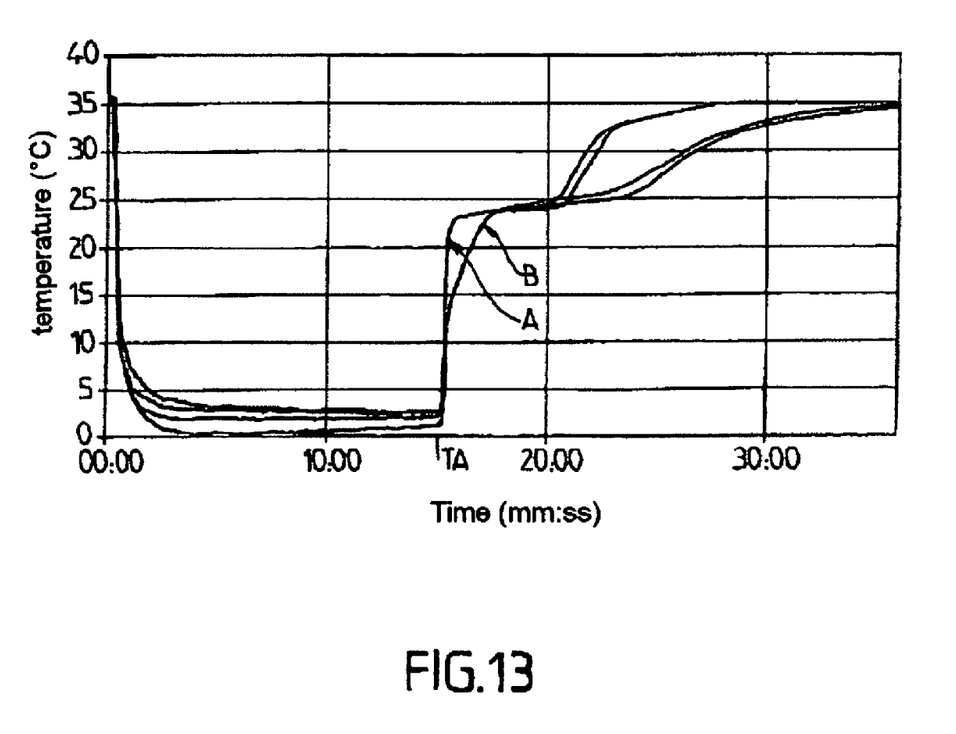
FIG. 13 is a graph illustrating the change in temperature of a flow of air leaving a conventional evaporator and leaving an evaporator with inertia according to the invention, after the operation of the evaporator has been stopped.

Reference is now made to FIG. 13 which shows the variations in temperature of the air leaving an evaporator as a function of time, on the one hand for a conventional evaporator, that is to say one without storage of phase-change fluid (curve A) and on the other hand, for an evaporator according to the invention with storage of a phase-change fluid (curve B). We start out here from the assumption that the temperature of the external air is 35° C. and the relative humidity of the external air is 40%. When the air-conditioning circuit is started up, the temperature falls from 35° C. to very quickly reach an outlet temperature of between 0° and 5° C.

The air-conditioning is then stopped after a time TA of about 15 minutes. As soon as the air-conditioning is stopped, the temperature rises again in both cases. However, in the case of a conventional evaporator, the temperature rise is far sharper, because in the case of an evaporator according to the invention, the curve is extended and it can be seen that the return to a temperature of close to 35° C. takes far longer.

This shows that the use of an evaporator with the storage of a phase-change fluid, according to the invention, makes it possible to store heat energy (cold energy) and transfer it to the air flow when the operation of the evaporator has been stopped.

The invention also applies, as already indicated, to heating radiators through which a heating fluid runs. The heat storage fluid then constitutes a reserve of heat or of heat energy. This fluid is then advantageously, although not necessarily, a phase-change fluid with a melting point of between 60 and 90° C., preferably between 70 and 80° C. This fluid is then advantageously chosen from paraffins, hydrated salts and eutectic compounds.

Among paraffins, mention may in particular be made of those denoted by the trade names RT65, RT80 and RT90 by Rubitherm or alternatively TH89 and TH58 by Teap.

The invention can be varied in numerous ways. It applies more particular to motor vehicles with internal combustion engines, but can also be applied to electrical motors or hybrid engines/motors.

We claim:

1. A heat exchanger for a fluid circuit through which a heat transfer fluid runs, comprising:
    at least one manifold delimiting an inlet and an outlet for the heat transfer fluid;
    circulation ducts for the heat transfer fluid which are inserted between the inlet and the outlet;
    heat-exchange surfaces associated with the heat transfer fluid circulation ducts and able to be swept by a flow of air that is to be conditioned;
    cavities designed to contain a heat storage fluid, situated adjacent to the heat transfer fluid circulation ducts; and
    a multiplicity of parallel flat tubes having two opposed large faces and in which the ducts and the cavities are formed, and a multiplicity of corrugated inserts forming heat-exchange surfaces, each of which is arranged between two adjacent tubes,
    whereby the cavities associated with the heat-exchange surfaces in such a way that the heat storage fluid is able to exchange heat with the air flow that sweeps the heat-exchange surfaces if the circulation of the heat transfer fluid through the circuit is stopped, and wherein each flat tube is of one piece, the ducts are arranged in groups between the large faces, and the cavities are arranged in groups between the large faces, the groups of ducts alternating with the groups of cavities.

2. The heat exchanger as in claim 1, further comprises at least one conduit which communicates with the cavities.

3. The heat exchanger as in claims 1, wherein the heat storage fluid is chosen from paraffins, hydrated salts and eutectic compounds.

4. The heat exchanger as in claims 1, wherein the heat storage fluid is chosen from paraffins, hydrated salts and eutectic compounds.

5. The heat exchanger as in claim 1, wherein the heat storage fluid also comprises water.

6. The heat exchanger as in claim 1, wherein the heat transfer fluid found in the circulating ducts for the heat transfer fluid of the heat exchanger, heats up the flow of air which sweeps across the heat-exchange surfaces, and the heat storage fluid adjacent to the heat transfer fluid circulating ducts constitutes a reserve of heat such that it is able to heat up the flow of air which sweeps across the heat-exchange surfaces if the circulation of the heating fluid through the heating radiator is temporarily stopped.

* * * * *